Patented June 21, 1938

2,121,449

UNITED STATES PATENT OFFICE 2,121,449

2-AMINO-8-HYDROXY-QUINOLINE AND ITS SALTS AND PROCESSES FOR PRODUCING THE SAME

Herman J. Schneiderwirth, Laurelton, N. Y.

No Drawing. Application March 18, 1936, Serial No. 69,529

1 Claim. (Cl. 260—38)

My invention relates to amino-hydroxy-quinolines and refers particularly to 2-amino-8-hydroxy-quinoline, its compounds and methods for their production.

I give the following as examples of methods for the production of 2-amino-8-hydroxy quinoline and its compounds.

Example 1

*Production of 2-amino-8-hydroxy-quinoline*

100 grams of finely powdered 8-hydroxy-quinoline are thoroughly mixed with 90 grams of finely powdered sodamide and placed into a steel container, preferably having a cover with an opening therein for the escape of undesirable fumes during the operation, and a suitable stirring apparatus extending to the bottom of the container.

The mixture is heated to about 100° C. at which temperature the 8-hydroxy-quinoline has melted forming a liquid above the sodamid. The stirrer is now set in motion and the temperature increased. At about 130° C. hydrogen is evolved and escapes through the cover opening and during the next 3 to 5 hours the temperature is gradually raised to about 200° C., at which temperature the evolution of hydrogen increases. During the following 3 to 5 hours the temperature is gradually increased to about 300° C. and finally to about 350° C. in the following 3 to 5 hours, at which time the development of hydrogen has decreased to a minimum.

The mixture is then cooled and about 300 c. c. of water, or water saturated with ammonia gas, are gradually added and the mixture brought to the boiling temperature and maintained until no further gas resulting from the decomposition of the product is evolved.

The mixture is then poured, or drawn off into a suitable container and cooled to about 0° C., a semi-solid cake separating from the concentrated aqueous solution of sodium hydroxide and sodium carbonate. This cake contains the 2-amino-8-hydroxy-quinoline which is separated from impurities present and purified preferably by the following method:—a mixture of equal quantities of water, alcohol and hydrochloric acid, or other suitable acid, is added to the cake until it is slightly acid, more alcohol and water being added if necessary to dissolve the cake, the mixture being heated to effect a solution. This dark solution is clarified with charcoal and filtered, then made slightly alkaline with ammonia or sodium hydroxide, whereby the impurities precipitate. These are separated from the liquid preferably by filtration, the solution containing the 2-amino-8-hydroxy-quinoline. As the precipitate contains still some 2-amino-8-hydroxy-quinoline, it is dissolved in an acid-alcohol-water solution, again precipitated with ammonia or alkali, filtered and this operation repeated a sufficient number of times to recover the remaining 2-amino-8-hydroxy quinoline. The filtrates are combined, clarified with charcoal, filtered and concentrated, preferably in a vacuum.

The solution is then cooled to about 0° C., the 2-amino-8-hydroxy-quinoline crystallizing out in the form of light white crystals usually in starlike formations, melting between 61° C. and 63° C., soluble in hot water, slightly soluble in cold water, the solutions have a fairly strong alkaline reaction and are practically tasteless, colorless and odorless. It is easily soluble in alcohol, glycerine, less soluble in acetone and practically insoluble in benzene, toluene and other similar organic compounds. After diazotization it couples with amino and diamino compounds to produce dyes.

The 2-amino-8-hydroxy quinoline can also be separated and purified by vacuum distillation of the originally obtained cake, whereby a solid, soft, crystalline mass is obtained.

The treatment of the 8-hydroxy-quinolines with sodamid can also be conducted in the presence of a liquid inert dispersing agent as Russian mineral oil, paraffin, ethyl phthalate and methyl phthalate, this dispersing agent facilitating the stirring operations when operating with large quantities.

Example 2

*Production of compounds of 2-amino-8-hydroxy quinoline*

160 grams of 2-amino-8-hydroxy-quinoline are dissolved in 10 liters of hot water in a flask having a reflux condenser. When boiling, 138 grams of salicylic acid are slowly added over a period of about 1 hour. The solution is boiled for several hours, filtered through charcoal and cooled to about 0° C., when the salicylic acid compound of 2-amino-8-hydroxy quinoline crystallizes out it is separated and dried.

It has the formula

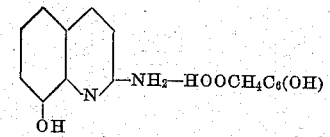

It has a melting point of between 240° C. and

243° C., is soluble in water, glycerine, and alcohol, and is insoluble in benzene, toluene and other similar organic compounds. Its aqueous solution is slightly alkaline. A small quantity of hydrochloric acid does not affect the solubility in an aqueous solution, but a large quantity of the acid separates the salicylic acid. It has been found to be of value in the treatment of arthritis and kindred conditions and it possesses strong bactericidal and spermatocidal action and therefore possesses valuable medicinal properties.

In essentially the same manner I have produced a number of other compounds and salts of 2-amino-hydroxy-quinoline by employing other acids, particularly the carboxylic acids of mono- and poly-basic acids of the aromatic and fatty-acid series, combining them in equivalent molecular quantities.

Among the other acids thus suitable for producing the acid salts of 2-amino-8-hydroxy-quinoline are thio-salicylic acid, benzoic acid, malic acid, lactic acid, acetic acid, tartaric acid, citric acid, hydrochloric acid, and sulphuric acid, but I do not limit myself to these particular acids.

I do not limit myself to the particular mentioned chemicals, times, temperatures, quantities or steps of procedure, as these are given simply as a means for clearly describing my invention.

What I claim is:—

2-amino-8-hydroxy-quinoline.

HERMAN J. SCHNEIDERWIRTH.